(12) United States Patent
Hochstein et al.

(10) Patent No.: US 7,533,431 B2
(45) Date of Patent: May 19, 2009

(54) ILLUMINATING DOCK LEVELER

(75) Inventors: Al Hochstein, Milwaukee, WI (US); Kyle Nelson, Cedarburg, WI (US); Matt Sveum, Wauwatsoa, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 191 days.

(21) Appl. No.: 11/484,413

(22) Filed: Jul. 11, 2006

(65) Prior Publication Data
US 2008/0010757 A1 Jan. 17, 2008

(51) Int. Cl.
*E01D 1/00* (2006.01)
*E01D 15/00* (2006.01)

(52) U.S. Cl. .......................... 14/69.5; 14/71.1; 14/71.3; 362/427

(58) Field of Classification Search ......... 14/69.5–71.5; 362/145, 427
See application file for complete search history.

(56) References Cited

U.S. PATENT DOCUMENTS

| | | | |
|---|---|---|---|
| 2,538,655 A * | 1/1951 | Preston | 362/427 |
| 4,973,016 A | 11/1990 | Hertenstein | |
| 5,396,676 A | 3/1995 | Alexander et al. | |
| 5,459,963 A | 10/1995 | Alexander | |
| 5,586,355 A | 12/1996 | Metz et al. | |
| 5,709,458 A * | 1/1998 | Metz | 362/96 |
| 6,502,268 B2 | 1/2003 | Ashelin et al. | |
| 6,812,849 B1 | 11/2004 | Ancel | |
| 7,101,064 B2 | 9/2006 | Ancel | |
| 7,137,162 B2 * | 11/2006 | Spencer et al. | 14/71.5 |
| 2003/0151912 A1 * | 8/2003 | Ancel | 362/145 |
| 2005/0102041 A1 | 5/2005 | Duvernell et al. | |
| 2005/0168999 A1 * | 8/2005 | Sommers et al. | 362/427 |
| 2005/0198750 A1 * | 9/2005 | Spencer et al. | 14/71.5 |
| 2006/0028065 A1 * | 2/2006 | Thiede et al. | 303/193 |
| 2006/0051196 A1 * | 3/2006 | McDonald | 414/809 |

(Continued)

FOREIGN PATENT DOCUMENTS

DE 1772370 8/1958

(Continued)

OTHER PUBLICATIONS

European Patent Office, "PCT International Search Report," issued by the European Patent Office on Dec. 6, 2007, in connection with a counterpart international application No. PCT/US2007/072910 (4 pages).

(Continued)

*Primary Examiner*—Raymond W Addie
(74) *Attorney, Agent, or Firm*—Hanley, Flight & Zimmerman LLC

(57) ABSTRACT

A dock leveler for a truck loading dock includes a lighting system mounted to the deck of the leveler. The lighting system can be used for illuminating the interior of a trailer, illuminating the deck of the dock leveler, and/or providing a warning signal that alerts nearby pedestrians and others in the area that work is being done at the loading dock. In some cases, the light is protected by a raised curb of the dock leveler's deck. In other cases, the lighting system is pivotally coupled to the deck so that the light can continue pointing toward the trailer regardless of whether the deck is in a horizontal operative position or a vertical stored position.

18 Claims, 5 Drawing Sheets

U.S. PATENT DOCUMENTS

2006/0137261 A1* 6/2006 Maly .......................... 52/36.3
2007/0068079 A1 3/2007 Morgan et al.

FOREIGN PATENT DOCUMENTS

EP 0017620 10/1980

OTHER PUBLICATIONS

European Patent Office, "PCT Written Opinion of the International Searching Authority," issued by the European Patent Office on Dec. 6, 2007, in connection with a counterpart foreign application No. PCT/US2007/072910, (7 pages).

Kelley Company, Inc., Brochure of Kelley Loading Dock Accessories, Jan. 1, 1980 (1 page).

International Searching Authority, "International Search Report," issued in connection with PCT application No. PCT/US2007/072906, mailed on Dec. 6, 2007, 4 pages.

International Searching Authority, "Written Opinion of the International Searching Authority," issued in connection with PCT application No. PCT/US2007/072906, mailed on Dec. 6, 2007, 6 pages.

* cited by examiner

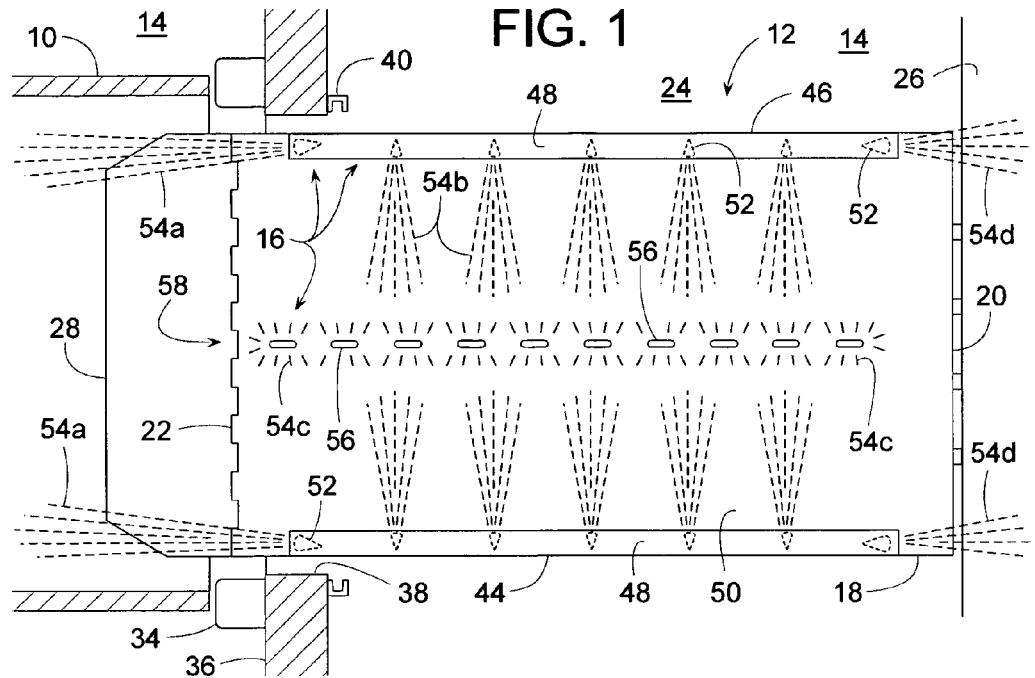
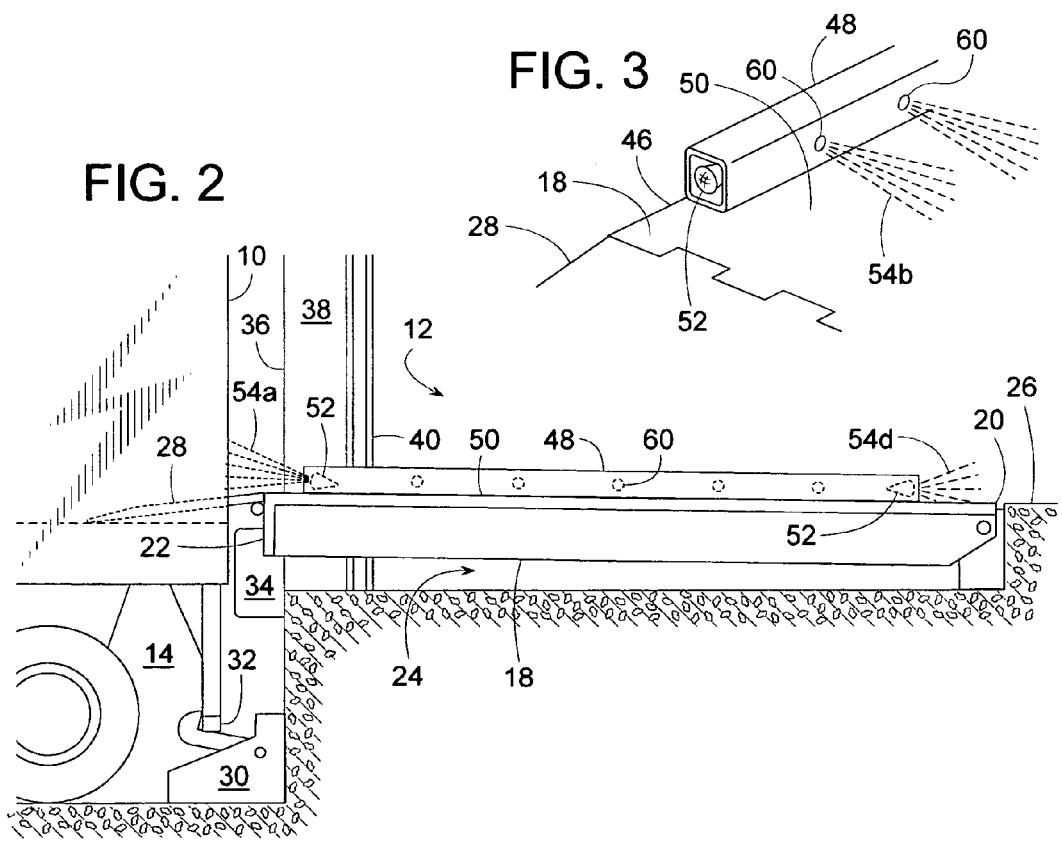

US 7,533,431 B2

ILLUMINATING DOCK LEVELER

FIELD OF THE DISCLOSURE

The present disclosure generally pertains to loading docks and more specifically to an illuminating dock leveler.

BACKGROUND

A typical loading dock of a building includes an exterior doorway with an elevated platform for loading and unloading vehicles, such as trucks and trailers. To compensate for height differences between the loading dock platform and an adjacent bed of a truck or trailer, many loading docks have a dock leveler. A typical dock leveler includes a deck or ramp that is pivotally hinged along its back edge to vary the height of its front edge. An extension plate or lip extends outward from the deck's front edge to span the gap between the rear of the truck bed and the front edge of the deck.

The deck is usually moveable between a stored position and an operative position. Depending on the style of dock leveler, the deck may store either vertically or horizontally. U.S. Pat. No. 6,502,268 shows an example of a horizontally storing deck, and U.S. Pat. No. 5,396,676 discloses a dock leveler with a vertically storing deck. In either case, the lip in the operative position extends from the deck's front edge and rests upon the trailer bed to form a bridge between the two. This allows personnel and material handling equipment to readily move on and off the vehicle during loading and unloading operations.

If the truck or trailer is enclosed, as opposed to being an open flat bed trailer, the inside of the trailer can be quite dark, making it difficult to see deep inside the trailer. So, articulated fight fixtures pointing into the trailer are often installed near the doorway of building. But since these fixtures protrude into the doorway, they can interfere with the operation of the door and are susceptible to being struck by forklifts entering and leaving the trailer. Moreover, when such fixtures are used with vertically storing dock levelers, the deck with its broad sweeping motion might tear the fixture completely off its mounting base.

Although some forklifts have headlights for looking into the trailer, it can still be difficult to back out of the trailer without driving off the side of the dock leveler's deck or possibly backing into a nearby pedestrian or other traffic in the building. Consequently, a need exists for a better way of not only illuminating the inside of a trailer but also for illuminating the dock leveler deck and surrounding area.

SUMMARY

In some examples, a lighting system is mounted to the movable deck of a dock leveler.

In some examples, a lighting system is at least partially sheltered or protected by a curb protruding upward from the deck.

In some examples, a light is projected from the deck into a trailer parked at the loading dock.

In some examples, a light is projected onto the deck of a dock leveler.

In some examples, the light provides an illuminated central guideline of the deck.

In some examples, a light fixture is pivotal relative to the deck with a center of gravity that maintains the light pointing forward regardless of deck's inclination.

In some examples, a lighting system includes a damper that dampens the light fixture's pivotal motion.

In some examples, a light fixture's pivotal motion is dampened by friction.

In some examples, a light fixture's pivotal motion is fluidly dampened.

In some examples, a lighting system selectively projects lights of various colors that signify different conditions at the loading dock.

In some examples, a lighting system selectively projects continuous or pulsating light to signify different conditions at the loading dock.

In some examples, a lighting system is automatically controlled in response to a sensor that detects various conditions relating to the door position, deck position, vehicle restraint, surrounding traffic of pedestrians or vehicles, motion of material handling equipment, or trailer presence.

BRIEF DESCRIPTION OF THE DRAWINGS

FIG. 1 is a top view of a dock leveler with a lighting system, wherein the dock leveler is in the operative position.

FIG. 2 is a side view of the dock leveler and lighting system of FIG. 1.

FIG. 3 is a close-up perspective view of the lighting system of FIGS. 1 and 2.

DETAILED DESCRIPTION

Figure 4:
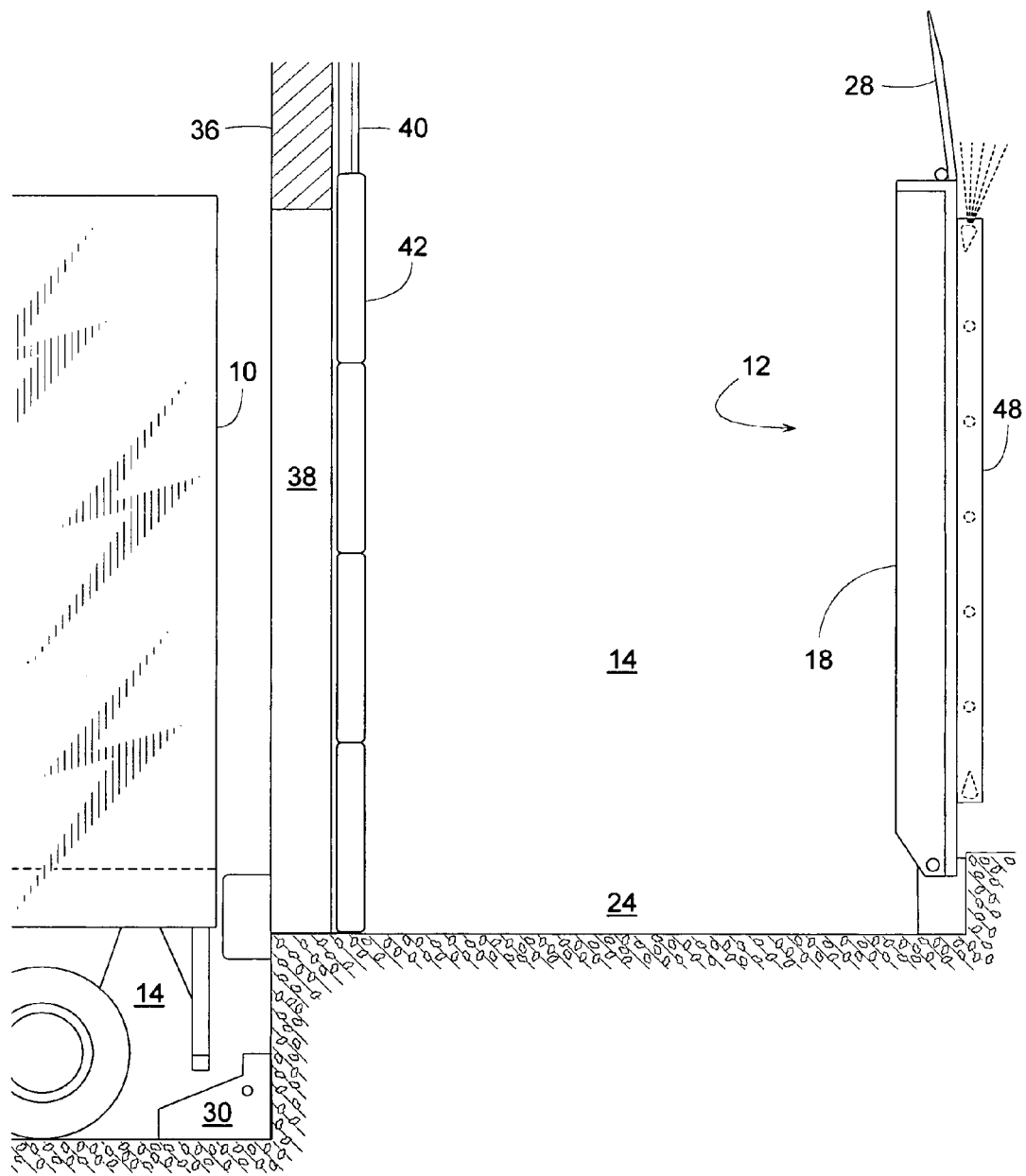
FIG. 4 is side view similar to FIG. 2 but showing the dock leveler in the stored position.

Referring to FIGS. 1-4, to illuminate the cargo bay of a vehicle, such as the interior of a trailer 10, a dock leveler 12 installed at a loading dock 14 includes a lighting system 16 mounted to the leveler's pivotal deck 18. Although, dock leveler 12 is shown as a vertically storing leveler, lighting system 16 can be applied to other types of dock levelers as well.

In the illustrated example, deck 18 pivots about a rear edge 20 to adjust the elevation of the deck's front edge 22. Deck 18 can pivot between a vertically stored position (FIG. 4) and an operative position (FIGS. 1 and 2). The mechanism for pivoting deck 18 has not been shown so as not to interfere with the illustration of other features of the disclosure; besides, such mechanisms are well known to those of ordinary skill in the art. A pit 24 or recessed area in a floor 26 allows deck 18 to place its lip 28 upon the trailer bed while maintaining rear edge 20 generally flush with floor 26, thus dockworkers, forklifts and other traffic at loading dock 14 can readily move between floor 26 and trailer 10.

Other loading dock related items that are well known to those of ordinary skill in the art include a vehicle restraint 30 for selectively engaging and releasing a rear impact guard 32 of vehicle 10, a bumper 34 mounted to an exterior building wall 36, a doorway 38 in wall 36 for providing access to the interior of trailer 10, and a wall-mounted track 40 for guiding a vertically moving door 42 across doorway 38.

To help prevent a forklift or other material handling equipment from accidentally driving off either of two lateral edges 44 and 46 of deck 18, two curbs 48 are installed along deck edges 44 and 46 and are mounted so as to protrude upward from a traffic surface 50 of deck 18. Thus, deck 18 comprises front edge 22, rear edge 20, and lateral edges 44 and 46, whereby the four edges generally define a quadrilateral extending around the periphery of traffic surface 50.

In some examples, lighting system 16 includes one or more deck-mounted light fixtures 52 that project light beams in one or more directions, depending on the needs of a particular installation. To illuminate the interior of trailer 10, for instance, lighting system 16 can project light beams 54$a$ in the same generally forward direction in which front edge 22 faces. To illuminate deck 18 itself, some light fixtures 52 can be installed within curb 48, so system 16 can project one or more light beams 54$b$ onto traffic surface 50. To help guide forklift traffic on surface 50, deck 18 may include a plurality of apertures 56 through which light beams 54$c$ can be projected from light fixtures installed beneath deck 18, whereby apertures 56 and light beams 54$c$ provide a luminous central guideline 58.

To alert others in the area that work is being done at loading dock 14, light fixtures 52 can be aimed to project light beams 54$d$ that illuminate floor 26 behind deck 18. To make the warning or alert more noticeable, light beams 54$d$ or 54$b$ can be flashing and/or be of a different or changing color. In some cases, lighting system 16 can be controlled automatically in response to various sensors, which will be explained later.

To protect light fixtures 52 from being struck by traffic on deck 18, fixtures 52 can be sheltered to at least some extent by the structure of curb 48 itself. In the example of FIG. 3, for example, curb 48 comprises structural metal tubing within which one or more light fixtures 52 can be installed. Side apertures 60 in the tubing can allow light beams 54$b$ to be projected from within curb 48. Individual light fixtures can be installed at each aperture, or a single light fixture 52 at one end of curb 48 and projecting its light beam along the internal length of curb 48 could project some light through apertures 60.

In some cases, the light directly at apertures 56 and 60 can be made more visible by installing a translucent plug or lens at each aperture.

Lighting system 16 may comprise various types of lighting elements, including but not limited to, halogen bulb, LED, rope light, etc.

Moreover, while lighting system 16 has been primarily shown as housed within curb 48, the disclosure is not so limited. Indeed, a leveler need not even employ curbs to 48 to realize the benefit of the disclosure. Rather, the lighting system 16 may be mounted to the deck 18. One alternative to mounting lighting system 16 within curb 48 was the mounting of light fixtures underneath the deck to project through apertures 56 in the deck itself. Another alternative would be to mount a lighting system to the underside of a vertically-storing leveler such as the one shown in the stored position in FIG. 4. Such a lighting system could be positioned to shine toward the doorway 38 with the leveler in the stored position. This would not only illuminate the interior of a trailer parked at the dock, but could also illuminate the dock area, doorway, and/or the door itself in its closed position. Another alternative mounting of a lighting system could be used in any leveler having a lip 28. In that alternative, a lip could be employed having a width narrower than that of the deck, creating open areas at the front end of the deck on either side of the narrow lip. The lighting system could then be mounted to or under the deck in or adjacent to these open areas. Other alternative mounting configurations for the inventive deck-mounted lighting systems will be apparent to one of ordinary skill in the art.

Figure 5:
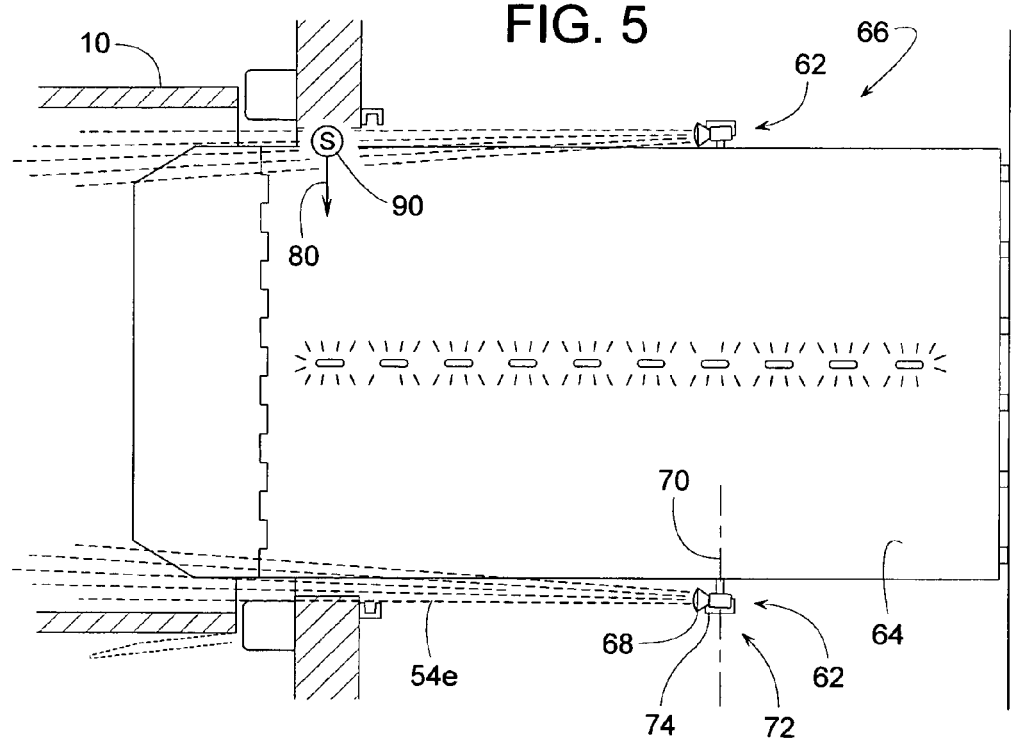
FIG. 5 a top view of another example.
Figure 6:
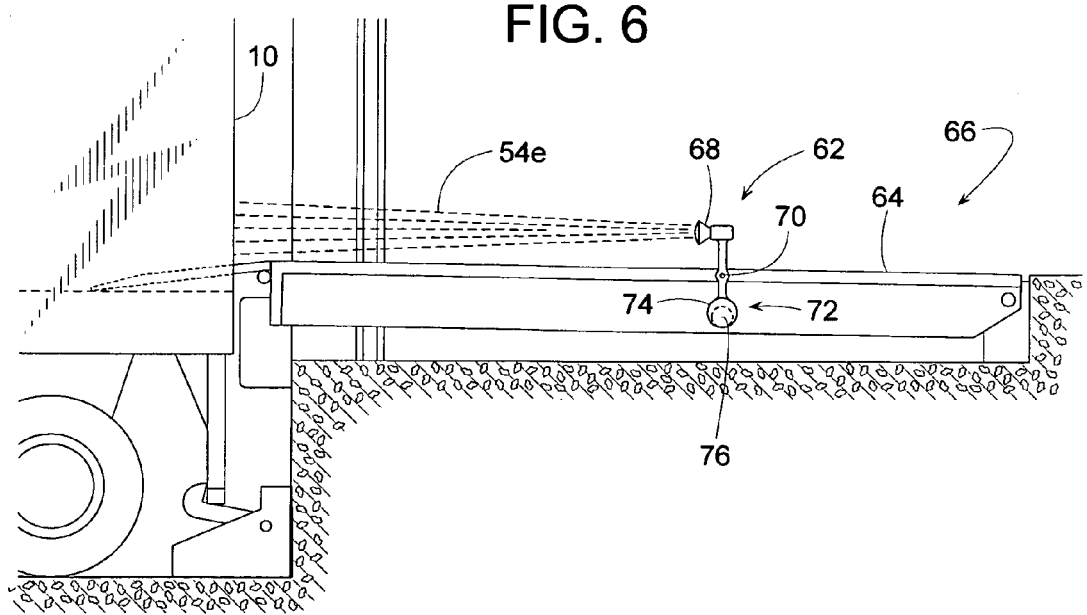
FIG. 6 is a side view of FIG. 5 showing the deck in an operative position.
Figure 7:
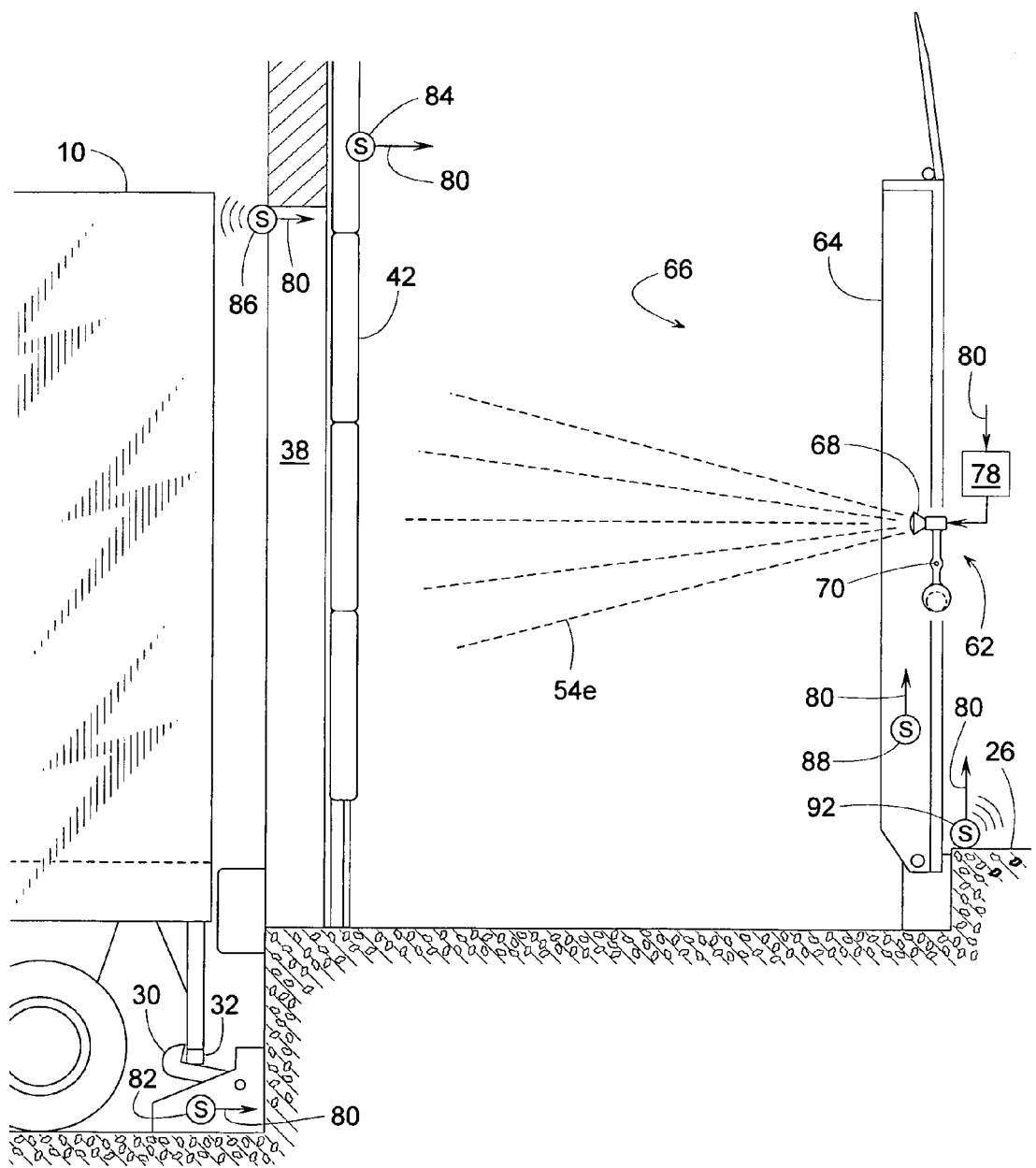
FIG. 7 is a side view of the example of FIG. 5 but showing the deck in vertically stored position.
Figure 8:
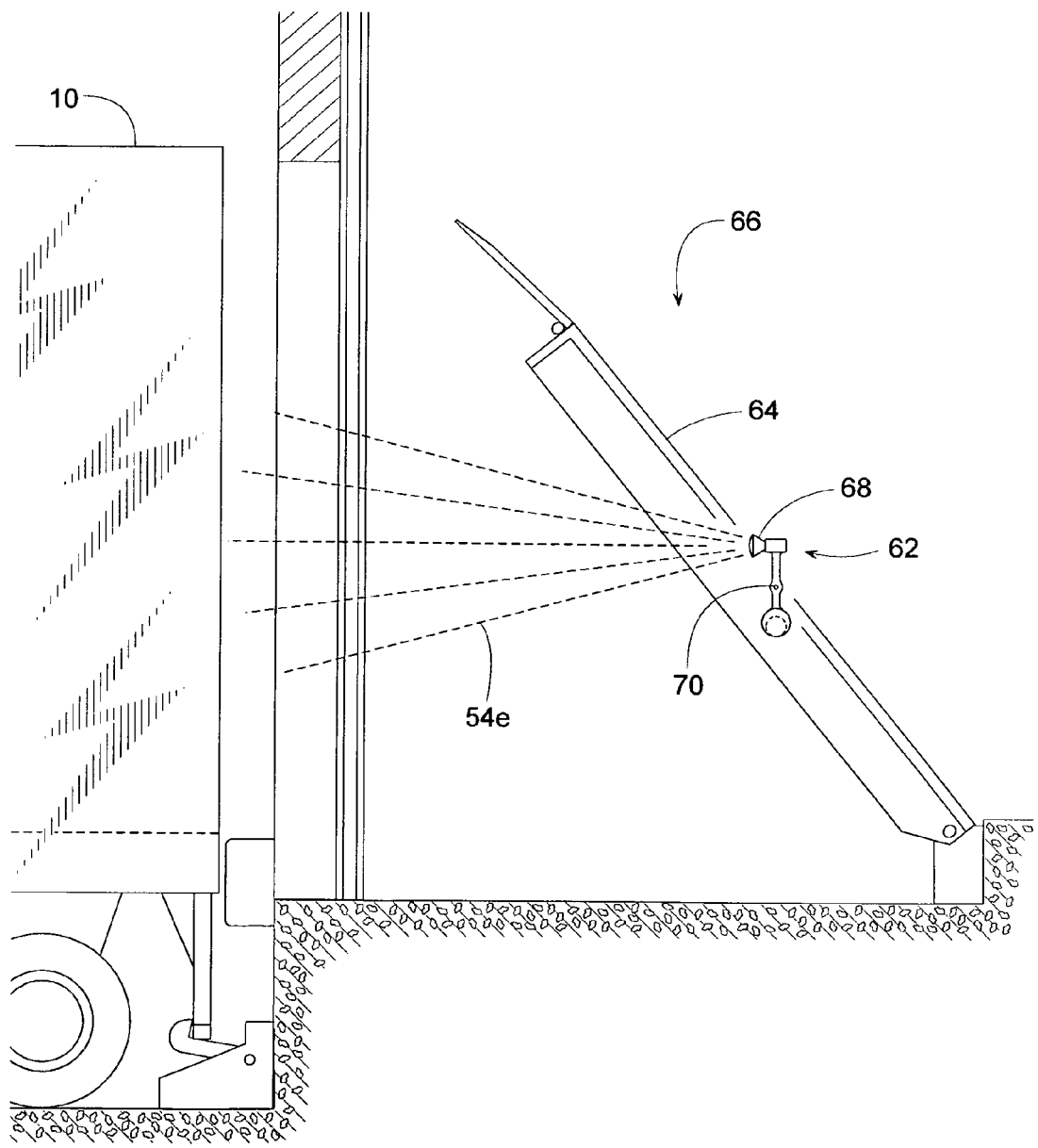
FIG. 8 is a side view of the example of FIG. 5 but showing the deck in an intermediate position.

While the lighting systems 16 depicted so far have been fixed relative to the deck 16, in an alternate example, shown in FIGS. 5-8, a lighting system 62 is pivotally coupled to a deck 64 of a dock leveler 66 so that system 62 can project a light beam 54$e$ that illuminates trailer 10 when door 42 is open or illuminates door 42 when the door is closed and can do so regardless of whether dock leveler 66 is in the operative position of FIGS. 5 and 6, in the stored position of FIG. 7, or in an intermediate position as shown in FIG. 8. System 62 includes a light fixture 68 that can freely pivot about an axis 70. To ensure that fixture 68 remains generally upright and pointed in the right direction, the fixture's center of gravity is below axis 70.

To help prevent fixture 68 from swinging unnecessarily with every incidental movement of deck 64, fixture 68 includes some type of damper 72 that employs friction, fluid flow, rotational inertia, and/or some other way of slowing the fixture's pivotal movement. To take full advantage of the fixture's rotational inertia, the light fixture's center of gravity should be just slightly below axis 70. In addition, or in other cases, fixture 68 may include a hermetically sealed fluid-filled cylindrical chamber 74 that perhaps contains a free-rolling weight 76, whereby weight 76 moving within the fluid or movement of the fluid alone dissipates energy without creating sufficient friction to hold fixture 68 at an improper angle, as might otherwise be the case with the use of frictional dampening alone.

While actuating lighting system 16 or 62 can be accomplished by manually actuating a switch, other control schemes are possible. As used herein, the term "actuate" when applied to lighting system described herein should be broadly construed. That is "actuation" of the inventive lighting systems could include such things as turning them off, flashing them, changing their color, changing their brightness, etc. For multiple lights, actuation may also mean illuminating them in some pre-defined or random pattern. The term actuate or actuation is thus meant to be construed broadly in this regard, as opposed to in a limiting manner. In some examples, a control circuit 78 (FIG. 7) can automatically actuate lighting systems 16 or 62 in response to a signal 80 from a sensor that that detects a certain change in the surroundings of the loading dock. Signal 80, for instance, could be from a sensor 82 that detects the actuation of vehicle restraint 30, wherein control circuit 78 actuates light system 62 when restraint 30 engages the vehicle's rear impact guard 32. In another case, signal 80 could be from a sensor 84 that detects the position of door 42, and control circuit 78 could actuate lighting system 62 as door 42 begins to open. Signal 80 could also be from a sensor 86 that detects the presence of trailer 10, and circuit 78 could actuate lighting system 62 when trailer 10 arrives at the loading dock. In another example, signal 80 could be from a sensor 88 that detects the movement of deck 64, and circuit 78 could actuate lighting system 62 as deck 64 begins to descend to its operative position.

In some cases, lighting system 16 or 62 could be automatically controlled in response to traffic entering or leaving the interior of trailer 10 or in response to pedestrians or other vehicles in the building. Referring to FIG. 5, for instance, signal 80 could be from a sensor 90 that detects the movement of a forklift inside trailer 10. In this case, circuit 78 might temporarily de-energize the lighting system as the forklift is leaving trailer 10 so as not to shine a bright light in the forklift driver's eyes.

Alternatively, in FIG. 7, a sensor 92 might be used to detect the presence of nearby pedestrians and other traffic on floor 26. In response to signal 80 from sensors 90 and/or 92, circuit 78 might actuate, one or more light fixtures 52 or 68, thereby warning the pedestrians, the forklift driver, or other traffic of a potential collision hazard.

Although certain example methods, apparatus and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. An illuminating dock leveler for supporting material-handling traffic near a doorway at a loading dock, the illuminating dock leveler comprising:
a deck pivotably mountable to the loading dock about a rear edge of the deck such that a front edge of the deck is vertically adjustable, and the deck includes a traffic surface adapted to support the material-handling traffic; and
a lighting system supported by the deck.

2. The illuminating dock leveler of claim 1, wherein the deck includes two lateral edges and a curb protruding upward from the deck, and wherein the curb is disposed along at least one of the two lateral edges, and helps shelter the lighting system.

3. The illuminating dock leveler of claim 1, wherein the lighting system projects a light beam in a general direction in which the front edge of the deck faces.

4. The illuminating dock leveler of claim 1, wherein the lighting system illuminates the traffic surface.

5. The illuminating dock leveler of claim 1, wherein the lighting system illuminates a central guideline on the deck for guiding traffic thereon.

6. The illuminating dock leveler of claim 5, wherein the deck defines a plurality of apertures, which in turn define the central guideline.

7. The illuminating dock leveler of claim 1, wherein the lighting system pivots relative to the deck in response to the deck moving to vertically adjust the front edge.

8. The illuminating dock leveler of claim 7, further compromising a damper coupled to the lighting system, wherein the damper dampens the movement of the lighting system as the deck moves.

9. The illuminating dock leveler of claim 1, wherein the lighting system selectively projects a plurality of colors.

10. The illuminating dock leveler of claim 1, further comprising a control circuit and a sensor, the sensor provides a signal in response to sensing a certain change in surroundings, the control circuit is coupled to the lighting system and the sensor to actuate the lighting system in response to the signal.

11. The illuminating dock leveler of claim 10, wherein the certain change in surroundings is a moving pedestrian.

12. The illuminating dock leveler of claim 10, wherein the certain change in surroundings is movement of a door in the doorway.

13. The illuminating dock leveler of claim 10, wherein the certain change in surroundings is movement of a vehicle restraint at the loading dock.

14. The illuminating dock leveler of claim 10, wherein the certain change in surroundings is movement of the deck.

15. The illuminating dock leveler of claim 10, wherein the certain change in surroundings is movement of a vehicle.

16. A method of operating a dock leveler at a dock position, comprising:
providing the leveler with a lighting system mounted to a deck of the dock leveler;
monitoring conditions at the dock position and/or its surroundings; and
in response to a change in conditions at the dock position, actuating the lighting system.

17. The method of claim 16, wherein the change in conditions makes the dock position less safe.

18. The method of claim 16, wherein the change in conditions is indicative of the operational state of dock-related equipment at the dock position.

* * * * *